United States Patent [19]
Voit

[11] Patent Number: 5,470,550
[45] Date of Patent: Nov. 28, 1995

[54] ZIRCONIUM SULFATE PRECIPITATION

[75] Inventor: Donald O. Voit, Ogden, Utah

[73] Assignee: Westinghouse Electric Corporation, Pittsburgh, Pa.

[21] Appl. No.: 175,842

[22] Filed: Dec. 30, 1993

[51] Int. Cl.$^6$ .................................................. C01G 25/00
[52] U.S. Cl. .................. 423/81; 423/82; 423/85
[58] Field of Search ................. 423/85, 81, 82, 423/608

[56] References Cited

U.S. PATENT DOCUMENTS

| | | | |
|---|---|---|---|
| 1,376,161 | 4/1921 | Pugh | 423/85 |
| 1,648,569 | 11/1927 | Trapp | 423/82 |
| 3,552,914 | 1/1971 | Greinacher et al. | 423/82 |
| 3,672,825 | 6/1972 | Gambale et al. | 423/82 |
| 4,256,463 | 3/1981 | Carter | 423/82 |

FOREIGN PATENT DOCUMENTS

| | | | |
|---|---|---|---|
| 59-39727 | 3/1984 | Japan | 423/608 |
| 60-96529 | 5/1985 | Japan | 423/608 |
| 61-11919 | 5/1986 | Japan | 423/608 |
| 1270515 | 10/1989 | Japan | 423/608 |
| 1175871 | 8/1985 | U.S.S.R. | 423/608 |

OTHER PUBLICATIONS

R. H. Nielsen & R. L. Goyro, "Zirconium Purification Using a Basic Sulfate Precipitation", U.S. Bureau of Mines Report No. 5214, Mar. 1956.

A. Nakamura et al., "Optimization of the Conditions for Producing Zirconia by the Precipitation of Basic Zirconium Sulfate", 24th Congresso Brasileiro De Ceramica 1983, no month.

D. R. Ricci et al., "Optimization of the Conditions for Producing Zirconia by the Precipitation of Basic Zirconium Sulfate", 32nd Congresso Brasileiro De Ceramica, vol. 2, pp. 602–631, 1988.

L. G. Nekhamkin et al., "Precipitation of Basic Zirconium and Hafnium Sulfates from Chloride and Nitrate Solutions", Moscow Institute of Fine Chemical Technology, pp. 1–6, no date.

M. Chatterjee et al. "Characterization of Basic Zirconium Sulfate, Precursor For Zirconia", Journal of Materials Science Letters 8, no month, 1989, pp. 548–550.

V. G. Chukhlantsev et al., "Thermal Decomposition of Basic Zirconium Sulfate", Russian Journal of Inorganic Chemistry, 18(6), 1973, pp. 770–771.

L. M. Zaitsev et al., "Behavior of Zirconium Salts in Mixtures of Mineral Acids", Russian Journal of Inorganic Chemistry, 16(4), no month 1971, pp. 533–537.

(List continued on next page.)

Primary Examiner—Steven Bos

[57] ABSTRACT

Zirconium containing less than about 400 ppm aluminum/zirconium is produced by precipitating zirconium sulfate from an aqueous stream containing from 0.5 M to 2 M zirconium oxychloride and contaminated with from 1000 to 3000 ppm aluminum/zirconium and having an acidity of greater than 1.5 N total acid per M zirconium. Ammonium hydroxide having a concentration of at least 14% by weight is added to the zirconium-containing solution to adjust the acidity to between 0.6 and 1.2 N total acid/M zirconium. Because the acidity adjustment results in the premature and undesired precipitation of zirconium hydroxide and aluminum hydroxide, the solution is maintained at a temperature of 60° C. or more for 15 minutes to 60 minutes to dissolve at least some of the zirconium hydroxide without permitting the undissolved zirconium hydroxide to dehydrate to the extent that a gelatinous zirconium oxide precipitate forms. Ammonium sulfate or sulfuric acid is then added to the acid adjusted solution to provide a 0.6 to 0.9 M sulfur/M zirconium ratio for precipitating zirconium sulfate from the solution without coprecipitating aluminum. After mixing the precipitation agent and the zirconium-containing solution together to precipitate some of the zirconium, the slurry is maintained at a temperature of between 90° C. and the boiling point of the solution for at least 15 minutes to precipitate additional zirconium sulfate. The zirconium sulfate is filtered to produce an asfiltered cake contaminated with less than 400 ppm aluminum/zirconium.

5 Claims, 1 Drawing Sheet

OTHER PUBLICATIONS

S. M. Flaks et al., "Interaction of Zirconium Oxychloride with Sulfuric Acid in Aqueous Solutions", Zhurnal Prikladnoi Khimii, vol. 42, No. 8, Aug., 1969, pp. 1747–1754.

J. A. Dirkson, "Precipitation of Zirconium Sulfate in a Continuous Stirred Tank", B. S. Thesis University of Utah, Jun., 1988.

J. A. Dirkson, "The Precipitation of Basic Zirconium Sulfate in a Continuous Stirred Tank Reactor as a Precursor for Zirconia Ceramics", Chapter VII, PHD Thesis, 1.0–1.5, General Conclusions, no date.

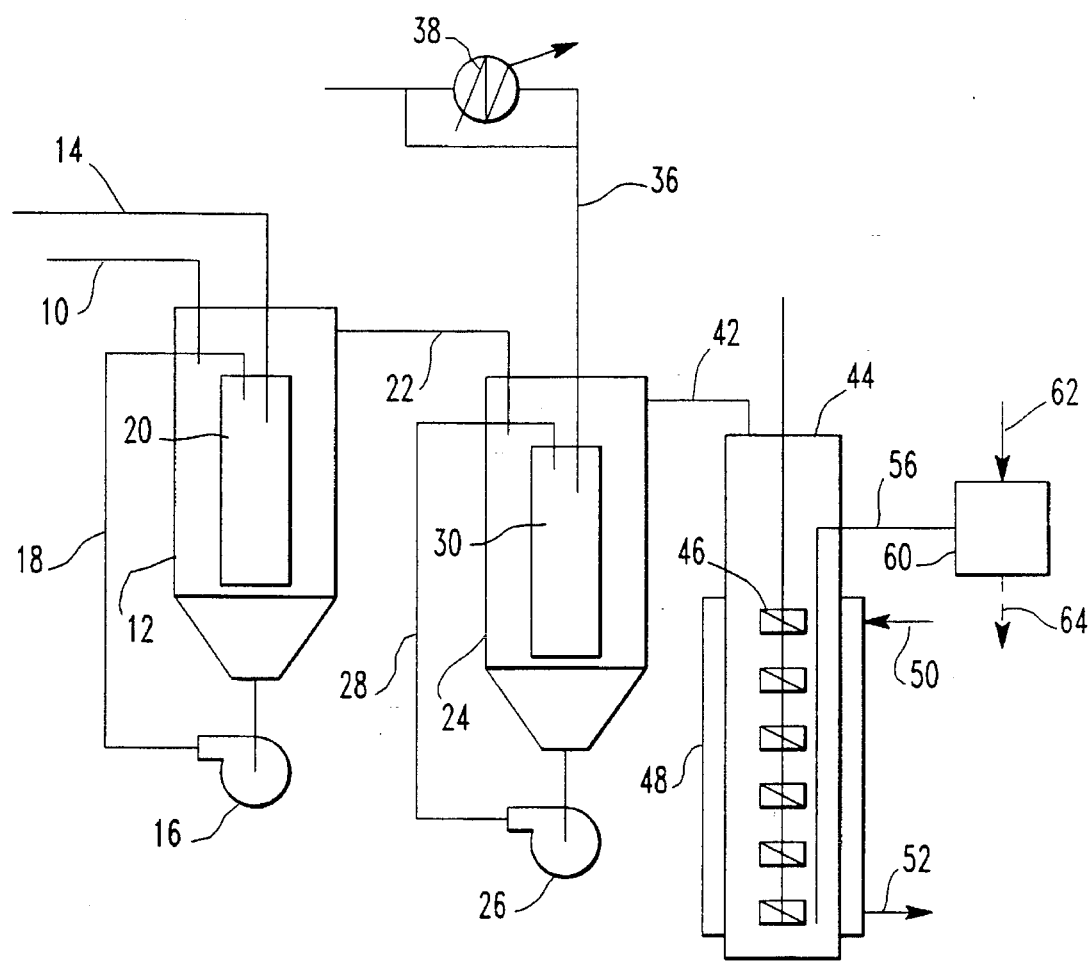

ZIRCONIUM SULFATE PRECIPITATION

BACKGROUND OF THE INVENTION

This invention relates to a method of precipitating zirconium sulfate and, more particularly, a method for precipitating zirconium sulfate from aqueous solutions contaminated with large amounts of aluminum. This invention is particularly useful in the production of nuclear grade zirconium.

Zirconium and zirconium oxide are commercially produced from zircon ore via the well known Kroll carbochlorination process. This ore is generally contaminated with relatively large amounts of hafnium and iron and lesser amounts of other metals, most importantly up to about 3000 parts aluminum per million parts zirconium, by weight (or 3000 ppm Al/Zr). In addition, the zirconium produced by commercial grade production processes will also be contaminated with up to about 3000 ppm Al/Zr because aluminum tends to track with the zirconium.

The production of nuclear grade zirconium requires that the aluminum contamination of zirconium be reduced to less than 60 ppm Al/Zr. In about 1954 the United States Bureau of Mines ("USBM") developed a process for producing nuclear grade zirconium which utilizes a sulfate precipitation step to purify the zirconium. This process is described in USBM Report RI5214. In USBM type of zirconium sulfate precipitation processes, a hot raffinate containing from about 0.5M up to about 2M zirconium tetrachloride or oxychloride at about 90° C. from a solvent extraction step (for separating hafnium and iron) is mixed with sulfuric acid or ammonium sulfate. The pH of the mixture is then adjusted to about 1.5 via the addition of an ammonia-containing solution. Acidity control is important in these processes because high pHs result in unacceptably high co-precipitation of aluminum and zirconium and low pHs result in unacceptably high zirconium losses. The S/Zr ratio of the solution is generally maintained at about 0.4.

The undesired precipitation of aluminum which occurs at transient high pH regions upon the addition of ammonia has been traditionally controlled by providing high levels of dilution for reducing the pH and long digestion times for dissolving the aluminum. Thus, dilution water is frequently added with the ammonium solution to prevent the undesired co-precipitation of zirconium hydroxide and aluminum hydroxide in transient high pH regions. Steam injection is frequently employed to maintain a reaction temperature of about 90° C. to about 100° C. and to dilute the ammonium concentration.

The precipitate is then filtered in a drum or other filter and washed to produce a zirconium sulfate cake contaminated with less than 60 ppm aluminum. Depending upon the amount of wash water, the aluminum levels of the cake may be reduced to less than about 10 ppm aluminum.

Although the prior art precipitation processes produce nuclear grade zirconium on a commercial scale, these zirconium sulfate precipitation processes are very sensitive to process variables and occasionally produce precipitates which cannot be effectively filtered. If the pH is too high or if the digestion time is too long, zirconium hydroxide may dehydrate and form gelatinous zirconium oxide-containing precipitates. Also, the precipitate may have an high aluminum content. The filtration step will in such cases require the use of hydrochloric acid or other suitable acid or additional wash water to dissolve the aluminum or wash the precipitate or otherwise cure the process condition.

SUMMARY OF THE INVENTION

It is an object of the present invention to provide an improved zirconium sulfate precipitation process which produces an unwashed zirconium sulfate precipitate contaminated with no more than about 400 ppm aluminum. It is a further object of the present invention to produce zirconium sulfate precipitate on a commercial scale with less waste product being generated.

With these objects in view, the present invention resides in a method for precipitating zirconium as a sulfate from an aqueous zirconium oxychloride-containing solution containing from about 0.5 to about 2 Molar (or "M") zirconium and contaminated with from about 1000 to about 3000 ppm Al/Zr, and having an acidity greater than about 1.5 Normal (or "N") total acid/M zirconium. As employed herein, the term "total acidity" (or "TA") refers to the acidity of a solution considered as a whole as determined by titration with a suitable standard, such as a sodium hydroxide solution.

An aqueous solution having a concentration of at least about 14% by weight ammonium hydroxide is added to the zirconium-containing solution in an amount sufficient to adjust the acidity of the zirconium-containing solution to between about 0.6 and about 1.2N TA/M zirconium. Most preferably, the acidity of the solution is adjusted to at least about 0.8N TA/M zirconium for substantially preventing room temperature precipitation of zirconium sulfate in the following precipitation step. The ammonium hydroxide solution and the zirconium-containing solution are then mixed together at a temperature of at least about 60° C. for about fifteen (15) minutes to about sixty (60) minutes to dissolve at least some of the zirconium hydroxide which tends to prematurely precipitate in the course of the acid adjustment step. Importantly, there are no transient high pH regions in the zirconium-containing solution resulting in substantial zirconium hydroxide precipitation and aluminum hydroxide co-precipitation which excessively contaminates the zirconium sulfate precipitate. In addition, those hydroxides which do precipitate and are not dissolved in this time do not have sufficient time to dehydrate to an extent that gelatinous precipitates form which renders the precipitate impossible to filter. Advantageously, the careful addition and thorough mixing of concentrated (14% or more) ammonium hydroxide to adjust the acidity of a heavily ladened zirconium-containing stream also reduces the quantity of process and waste streams employed in the process without degrading the final product.

A precipitation agent selected from ammonium sulfate and sulfuric acid is added to the zirconium-containing acid adjusted solution in an amount sufficient to provide from about 0.6 to about 0.9M sulfur/M zirconium. The precipitation agent and the zirconium-containing solution are the mixed together to precipitate at least some zirconium sulfate. Preferably, the sulfate concentration is at least about 0.8M sulfur/M zirconium to provide a suitably large particle size. The precipitation agent and the zirconium-containing solution are then maintained at a temperature between about 90° C. and the boiling point of the zirconium-containing solution for at least about fifteen (15) minutes to precipitate additional zirconium sulfate precipitate.

The zirconium sulfate precipitate is then filtered from the filtrate solution. An unwashed zirconium sulfate cake produced in accordance with the present invention has less than about 400 ppm Al/Zr. Advantageously, when later washed with at least about one volume of water/volume of precipitate, the washed precipitate will contain less than about 60 ppm aluminum/zirconium. Preferably, at least about 90% of the zirconium in the provided solution is recovered.

BRIEF DESCRIPTION OF THE DRAWINGS

The invention will become more readily apparent from the following description of a preferred practice thereof shown, by way of example only, in the accompanying process flow drawing.

DESCRIPTION OF A PREFERRED PRACTICE

The preferred practice of the method of the present invention may be advantageously performed as a continuous process on a commercial scale with the type of equipment shown in the process flow drawing. The present invention may also be performed as a semi-continuous process or as a batch process with the equipment shown in the accompanying flow drawing or by other equipment for performing the same unit processes.

In the production of nuclear grade zirconium via a Kroll process as discussed above, a zirconium-containing aqueous solution (or raffinate) from a hafnium solvent extraction step is provided via a pipe 10 to an acid adjustment vessel 12 at about 90° C. or 95° C. Typically, a raffinate from a hafnium solvent extraction step generally has an acidity of more than 1.5N TA/M zirconium. The acidity of the raffinate is determined by the process requirements of the solvent extraction step. However, highly acid conditions are undesirable in a zirconium sulfate precipitation step because high acid levels result in unacceptable zirconium losses. Typically, the raffinate contains about 0.5 to about 2M zirconium which is present as dissolved zirconium tetrachloride or zirconium oxychloride and is contaminated with from about 1000 ppm to about 3000 ppm Al/Zr (i.e., 1000–3000 parts aluminum to a million parts zirconium, by weight).

A raffinate will also contain trace amounts of methyl isobutyl ketone (or "mibk") solvent from the extraction step and phosphorus and hafnium as impurities. The mibk solvent will be stripped from the solution without substantial adverse affect upon the subsequent precipitation step and the phosphorus and the hafnium tend to coprecipitate with the zirconium.

An aqueous solution of at least about 14 wt. % ammonium hydroxide is added via a pipe 14 to the acid adjustment tank 12 to adjust the acidity of the solution in the tank 12 to between about 0.6N and about 1.2N TA/M zirconium. Although temporary high local pH transients occur with the addition of highly concentrated ammonium hydroxide, which results in the premature precipitation of zirconium hydroxide and perhaps to a lesser extent aluminum hydroxide, the zirconium-containing solution is maintained at a temperature of at least about 60° C. for from about fifteen (15) minutes to about sixty (60) minutes for dissolving at least some of the zirconium hydroxide which precipitates before the precipitation agent is added. It has been found that the undissolved zirconium hydroxide which precipitates in this period does not result in substantial aluminum contamination of zirconium sulfate precipitate or otherwise result in an unfilterable gelatinous precipitate. In contrast with prior art practices, where substantial amounts of dilution water may be added to reduce the ammonium hydroxide concentration to about 5 wt % or less, the use of concentrated ammonium hydroxide results in lesser quantities of the process streams. The ammonium hydroxide solution may be produced by diluting commercially available 28% ammonium hydroxide with water. In other practices, undiluted 28% ammonium hydroxide solutions or an ammonia gas may be alternatively added to aqueous streams containing more than about 0.5M zirconium.

The acid adjustment vessel 12 preferably has a circulation pump 16 for recirculating the solution in the vessel 12 via a recirculation pipe 18. As shown in the drawing, the ammonium hydroxide addition pipe 14 and the recirculation pipe 18 may be fed into a draft tube 16 to dilute the ammonium hydroxide to reduce its concentration before contacting the heavily ladened zirconium-containing feed provided via pipe 10. The vessel 12 provides a nominal residence time of from about fifteen (15) minutes to about sixty (60) minutes for the acid adjusted zirconium-containing solution (i.e., vessel 12 volume/ total solution volumetric flow rate from pipes 10 and 14). More preferably, the residence time in the vessel 12 is from about fifteen (15) minutes to about thirty (30) minutes. Shorter times can result in transient regions in the solution leaving the vessel 12 having high pHs contaminated with significant amounts of zirconium hydroxide and, perhaps, aluminum hydroxide. Longer residence times can lead to significant condensation polymerization of zirconium hydroxide to form unfilterable precipitates. The temperature of the tank 12 is maintained at about 60° C. or more by a steam jacket, immersion heater (not shown) or other suitable means to dissolve at least some of the zirconium hydroxide which prematurely precipitates in this step without diluting the process stream.

As shown in the process flow drawing, the acid adjusted zirconium-containing solution preferably overflows from the acid adjustment vessel 12 via a pipe 22 into a precipitation vessel 24. A precipitation agent selected from the group consisting of ammonium sulfate and sulfuric acid concurrently may be added to the precipitation vessel 24 via a pipe 36 and precipitation will begin almost instantaneously. The precipitation agent is added in an amount sufficient to provide a M sulfur/M zirconium ratio (i.e., a molar ratio) of from about 0.6 to about 0.9. Lower ratios can result in precipitates containing excessive amounts of zirconium hydroxide. Higher ratios can result in small sulfate particles. Preferably, the sulfur/zirconium molar ratio is about 0.8 for producing particles having an average size of about 20 micrometers (or microns). The zirconium-containing solution and precipitation agent are maintained at a temperature of from at least about 90° C. and the boiling point of the mixture for at least about fifteen (15) minutes for precipitating additional zirconium sulfate.

As is also shown in the process flow drawing, the precipitation vessel 24 may be similar to the acid adjustment vessel 12. Thus, the precipitation vessel 24 preferably has a circulation pump 26, a recirculation pipe 28, a draft tube 30 and an overflow pipe 32. A precipitation agent selected from the group consisting of ammonium sulfate and sulfuric acid is provided via a pipe 36 to the top of the draft tube 30 of the precipitation vessel 24 where it is diluted with recirculating solution before contacting the acid-adjusted solution from the overflow pipe 22. The precipitation tank 24 preferably has a residence time of at least about fifteen (15) minutes to facilitate thorough mixing of the two feed streams and the precipitation of at least some of the zirconium sulfate. Preferably, at least about 50% of the nucleation of the zirconium sulfate precipitate occurs in this vessel 24. Advantageously, a draft tube design tends to prevent attrition of the sulfate particles which form in the precipitation vessel 24.

The precipitation agent in pipe 36 may be preheated in a heat exchanger 38 to a temperature of up to about 95° C. to facilitate the initial precipitation of zirconium sulfate in the precipitation vessel 24. However, the temperature of the precipitation agent must be carefully controlled to prevent the nucleation of too many particles. Excessive nucleation may be corrected in the process by holding the slurries for relatively long period of times.

The solution in the precipitation vessel 24 then overflows via an overflow pipe 42 to a finishing vessel 44 where the zirconium continues to precipitate. A preferred plug flow vessel 44 has a length/diameter ratio of at least 5/1 and paddle-type agitator blades 46. The temperature of the solution in the finishing vessel 44 is maintained at a temperature of from about 95° C. to about the boiling point of the solution by any, suitable means such as a steam jacket 48. Steam may be introduced into the jacket 48 via a steam pipe 50 and condensate removed via a condensate pipe 52. The plug flow vessel 42 has a residence time of at least about fifteen (15) minutes and, more preferably, of about thirty (30) minutes for growing zirconium sulfate particles of suitable size.

The zirconium sulfate slurry in the finishing vessel 44 then overflows via a pipe 56 to a filter 60. The filter 60 may be preceded by a thickener (not shown) if desired. The unwashed zirconium sulfate precipitate filtered from the solution (typically containing about half its weight of entrained mother liquor) is contaminated with less than about 400 ppm Al/Zr. At least one precipitate volume of wash water from a pipe 62 may be then employed to reduce the aluminum concentration of the precipitate to less than 60 ppm Al/Zr and, more preferably, to about 10 ppm Al/Zr.

Preferably, the filter 60 is a Larox plate and frame type of filter, but it may be a rotary drum in other practices. A Larox filter generally permits positive and uniform washing and greater dewatering than does a rotary drum type of filter. Thus, Larox will generally produce a somewhat better precipitate than will a rotary drum type filter.

While a preferred practice of the present invention has been shown and described, it is to be distinctly understood that the that the invention is not limited thereto but may be otherwise variously practiced within the scope of the following claims.

I claim:
1. A method of precipitating zirconium sulfate from an aqueous zirconium oxychloride solution containing aluminum comprising the steps of:
   (a) adding an aqueous ammonium hydroxide solution having a concentration of at least about 14 wt. % to an aqueous zirconium oxychloride solution containing from about 1000 to about 3000 parts aluminum per million parts zirconium and from about 0.5M to about 2M zirconium, and having an acidity greater than about 1.5N total acid per M zirconium, to form an acid adjusted solution having an acidity of between about 0.6N and about 1.2N total acid/M zirconium,
   (b) mixing the acid adjusted solution at a temperature of at least about 60° C. for about 15 to 60 minutes,
   (c) adding a precipitation agent selected from the group consisting of ammonium sulfate and sulfuric acid to the acid adjusted solution of step (b) in an amount sufficient to provide a sulfur/zirconium molar ratio of from about 0.6 to about 0.9 to precipitate zirconium sulfate and form a zirconium sulfate containing solution at a temperature between about 90° C. and the boiling point of the zirconium sulfate containing solution,
   (d) filtering the zirconium sulfate containing solution to recover zirconium sulfate having less than 400 parts aluminum per million parts zirconium.
2. The method of claim 1, characterized in that the acid adjusted solution of step (a) has an acidity of about 0.8 N total acid/M zirconium.
3. The method of claim 1, characterized in that a sufficient amount of precipitation agent is added, to provide a sulfur/zirconium molar ratio of about 0.8.
4. The method of claim 1, characterized in that at least about 90% of the zirconium in the aqueous zirconium oxychloride solution of step (a) is recovered as a zirconium sulfate precipitate.
5. The method of claim 1, characterized in that the sulfur/zirconium molar ratio is about 0.8 and the average particle size of the zirconium sulfate is about 20 microns.

\* \* \* \* \*